(12) United States Patent
Mess (10) Patent No.: US 9,569,554 B2
(45) Date of Patent: Feb. 14, 2017

(54) SYSTEM AND COMPUTER-IMPLEMENTED METHOD FOR INCORPORATING AN IMAGE INTO A PAGE OF CONTENT FOR TRANSMISSION OVER A TELECOMMUNICATIONS NETWORK

(75) Inventor: Bjarne Mess, Copenhagen Ø (DK)

(73) Assignee: Xink, Hellerup (DK)

( * ) Notice: Subject to any disclaimer, the term of this patent is extended or adjusted under 35 U.S.C. 154(b) by 691 days.

(21) Appl. No.: 13/560,699

(22) Filed: Jul. 27, 2012

(65) Prior Publication Data

US 2013/0031464 A1 Jan. 31, 2013

Related U.S. Application Data

(60) Provisional application No. 61/513,370, filed on Jul. 29, 2011.

(51) Int. Cl.
*G06F 17/00* (2006.01)
*G06F 17/30* (2006.01)

(52) U.S. Cl.
CPC ... *G06F 17/30893* (2013.01); *G06F 17/30905* (2013.01)

(58) Field of Classification Search
CPC .............. G06F 17/30893; G06F 17/30905
USPC .................................. 715/234, 200
See application file for complete search history.

(56) References Cited

U.S. PATENT DOCUMENTS

| | | | | |
|---|---|---|---|---|
| 6,252,971 B1 * | 6/2001 | Wang | | 382/100 |
| 6,615,239 B1 * | 9/2003 | Berstis | | 709/204 |
| 7,725,604 B1 * | 5/2010 | Levenberg | | 709/246 |
| 2005/0015626 A1 * | 1/2005 | Chasin | | 713/201 |
| 2010/0257243 A1 * | 10/2010 | Eilers et al. | | 709/206 |
| 2013/0305140 A1 * | 11/2013 | Ruan et al. | | 715/234 |

FOREIGN PATENT DOCUMENTS

DE   EP0967556 A2 * 12/1999 ............ G06F 17/30

* cited by examiner

*Primary Examiner* — Manglesh M Patel
(74) *Attorney, Agent, or Firm* — Park, Vaughan, Fleming & Dowler LLP (57) ABSTRACT

A system and method provide an image data file encoding said image in accordance with a standard image format and a page of content in a markup language, said page of content being intended for transmission over a telecommunications network from a server to a client for display by a browser running on the client, said page of content including a link or reference to the image data file for incorporating the image within the page of content. The image is converted from said standard image format into a format in which the image is encoded using said markup language, and the image encoded using said markup language is incorporated into the page of content to replace said link or reference to the image data file prior to transmission of the page of content.

14 Claims, 3 Drawing Sheets

SYSTEM AND COMPUTER-IMPLEMENTED METHOD FOR INCORPORATING AN IMAGE INTO A PAGE OF CONTENT FOR TRANSMISSION OVER A TELECOMMUNICATIONS NETWORK

RELATED APPLICATION

This application claims priority to U.S. Provisional Application No. 61/513,370, entitled "System and Computer-Implemented Method for Incorporating an Image into a Page of Content for Transmission Over a Telecommunications Network," by inventor Bjarne Mess, filed 29 Jul. 2011, the contents of which are incorporated herein by reference.

FIELD OF THE INVENTION

The invention relates to a system and computer-implemented method for incorporating an image into a page of content for transmission over a telecommunications network from a server to a client. The page of content and the incorporated image may be displayed by a browser running on the client.

BACKGROUND OF THE INVENTION

It is well known to include images in web pages. The standard way of doing this is to include an html link in the web page. An example of such a link is:

```
<img src="/images/diagram_small.jpg" width="295" height="235"
    alt="eMailSignature consists of three components" />
```

Here, the tag "img src" specifies the location of the image to be retrieved, which is a file "diagram_small.jpg" conforming to the JPEG image encoding standard. The file is located in the directory "/images/", while the full http address of the file can be determined from information provided in the remainder of the web page. The "alt" tag specifies some wording for the browser to display as an alternative to the image, for example, if the image cannot be successfully retrieved or displayed. The "width" and "height" tags specify the size of a rectangular box or window within which the image is to be displayed. Assuming a rectangular image, the image will generally be displayed so as to fill its display window.

As part of displaying or rendering a web page including the above html code, a browser accesses the location specified by the "img src" tag to retrieve the file containing the image data. The browser then determines the best location for presenting the image within the rendered page. This location can be selected having regard to the size of the image, the size of the screen used for the current display, etc.

In the operation of a standard browser, if a user right-clicks over the image, the user is presented with a menu of options relating to the image. For example, a user may be able to print the image, save the image as a file—i.e. a local duplicate of "diagram_small.jpg", copy the image into another application, and so on. However, such a facility may be undesirable for the provider of the web content, for example, if the image is subject to copyright restrictions or is otherwise considered to be valuable intellectual property. Likewise, many people upload various images onto social networking sites such as Facebook for sharing with friends. However, a user may prefer that his or her images are only available for viewing on this site, without allowing other people to easily download and copy such images.

SUMMARY OF THE INVENTION

One embodiment of the invention provides a computer-implemented method of incorporating an image into a page of content for transmission over a telecommunications network from a server to a client for display by a browser running on the client. The method comprises providing an image data file encoding said image in accordance with a standard image format; providing a page of content in a markup language, said page of content being intended for transmission over a telecommunications network from a server to a client for display by a browser running on the client, said page of content including a link or reference to the image data file for incorporating the image within the page of content; converting said image from said standard image format of the image data file into a format in which the image is encoded using said markup language; and incorporating the image encoded using said markup language into the page of content to replace said link or reference to the image data file, prior to transmission of the page of content over a telecommunications network.

By converting the image coding into a markup language, the image can now be integrated into the overall page of content. One consequence of this is that a browser can no longer readily distinguish the image from the remaining markup language encoding of the page content (in contrast to the situation where the image is separately retrieved via the link or reference). Accordingly, right clicking on the displayed image at the client is no different from right clicking anywhere in the main body of text for the page, and so any resulting operation, such as printing, will apply to the page content as a whole (rather than to just the portion of the page content that corresponds to the image). Indeed, in the Internet Explorer browser from Microsoft Corporation, right clicking the main body of page content does not provide the option of saving the corresponding material at all (although such saving can be implemented from the "File" menu).

Consequently, it is significantly more complicated for the user to save the image encoded in html language from the page content than it is to save an image included by means of a conventional link or reference to an image data file. Furthermore, even if the user does save the whole page content in its markup language, it is relatively difficult to extract just the markup language corresponding to just the image (rather than that corresponding to the whole page), especially if the markup language source coding for the page is lengthy and/or rather complex. In addition, although the markup version of an image may be readily displayed by a browser, there are many other systems in which the markup encoding may cause problems compared with the original image-specific format (such as JPEG). For example, electronic picture frames generally require an image-specific format for displaying an image. Likewise, many other computer applications that allow an image to be imported require the image to be encoded using a standard image-specific format. Accordingly, the approach described herein not only makes it harder to extract the image from the page content in the first place, but also makes it more difficult to (re)-use any image that a user does manage to extract. This provides enhanced protection for the intellectual property rights associated with the image.

In one embodiment, the image encoded using said markup language is incorporated into the page of content in response to parsing said reference or link. For example, the content server processes (parses) the page of content, detects the reference or link to the image data file, and proceeds to replace the link with the image encoded using the markup language. In some situations, the actual conversion of the image from the standard image format into the markup language is performed in response to a request from the client. Alternatively, the conversion of the image from the standard image format into the markup language may be performed in advance, i.e. prior to receiving such a request. In this latter case, the converted image may be stored separately from the page of content for future incorporation into the page of content.

In some implementations, the page of content incorporating the image using said markup language may be stored (as a whole) for re-use, for example, if the page is requested first by one client and then by another client (or repeatedly by the same client). Storing the page of content incorporating the converted image in this manner avoids having to perform the image conversion every time that the page is transmitted to a client.

In one embodiment, the method further comprises transmitting the page of content incorporating the image represented at a pixel level using said markup language from a server to a receiving client. A browser on the receiving client is able to render the page of content so as to display the image within said page by directly using the image encoded in said markup language, without having to retrieve any separate image source file.

In one embodiment, converting the image includes converting pixels of the image to dots in said markup language. The conversion may further include combining a series of two or more dots that are the same as one another into a line in said markup language. This latter functionality can reduce the size of the converted image (in terms of the amount of markup language used to represent the image).

In one embodiment, the method further comprises reducing the volume of the image encoded using said markup language, for example, by lowering the resolution of the image. Such lowering of the resolution can be performed prior to converting the image, or alternatively, the lowering of the resolution may be performed as part of converting the image.

In one embodiment, the markup language comprises hypertext markup language (html). Other markup languages such as wml may also be utilised where appropriate.

In one embodiment, the method further comprises compressing the page of content. Such compression might be performed, for example, prior to storing and/or transmitting the page of content including the converted image in order to save storage space or bandwidth (as appropriate). Such compression of the markup coding can be performed using any appropriate textual compression facility, e.g. LZW compression (rather than an image compression facility that could be applied to the original image-specific coding).

One embodiment of the invention provides a computer-implemented method of operating a web-site that provides accounts for respective users. The method comprises receiving an image uploaded from a user to the account of the user, wherein the image is to be incorporated into the account for presentation to other users who have been granted appropriate access to the account. The image is received as an image data file encoding the image in accordance with a standard image format. The image is then converted from the standard image format of the image data file into the format in which the image is encoded using a markup language. This markup language is generally used for transmitting a page of content from the web-site to a browser run by a user. The image encoded using said markup language is then incorporated into a page of content prior to transmission of the page of content over a telecommunications network to a browser run by a user.

Such a method could be used in conjunction with a social networking site, a photograph album site, a web-hosting server, and so on, where users upload material into their account. The material is made available for viewing by other users in accordance with the security settings (if any) on the account. The user may be happy to paste images to their account for other such users to be able to view, but may prefer that these images are not copied further (for example, for privacy reasons). Accordingly, the web site converts the images into a markup language format, which allows the images to be readily viewed, but makes it much more difficult for the images to be copied or otherwise manipulated. This conversion may be performed with any suitable timing, e.g. immediately after an image is uploaded, immediately before an image is viewed, or at some intermediate time.

Another embodiment of the invention provides a computer-implemented method of operating a web-site that provides image search services. The method comprises receiving a search request from a user for images that satisfy or match one or more specified search criteria. The web-site retrieves one or more images in accordance with the one or more search criteria, and provides the retrieved images to the user. The provided images are encoded using a markup language, wherein said markup language is generally used for transmitting a page of content from said web-site to a browser run by a user.

Such an approach allows the user to view the retrieved images, but makes it more difficult for the user to copy or otherwise exploit the images. In one implementation, the method further comprises providing at least one of the retrieved images to the user in a standard image format upon selection of said at least one retrieved image by the user. Providing the retrieved images to the user may be conditional, for example, based on receiving some form of payment from the user.

In one embodiment, the web-site further performs a conversion of said one or more retrieved images from an image data file in a standard image format into said markup language encoding. This conversion may be performed in response to the search request, after retrieving the images. Another possibility is that the images have already been converted prior to receiving the search request. For example, the images might be retrieved from a local store (cache) of already converted images. The conversion may have been performed in response to an earlier search request for which that image was included in the search results, or possibly when the image was first loaded into the store (perhaps as part of the web crawling service utilised by search engines to build search indices, etc).

Another embodiment of the invention provides a computer-implemented method of operating a web-site that provides image conversion services. The method comprises receiving an image uploaded from a user, wherein said image is received as an image data file encoding said image in accordance with a standard image format. The method further comprises converting the image from the standard image format of the image data file into a format in which the image is encoded using a markup language. The markup language is generally used for transmitting a page of content from said web-site to a browser run by a user. The method further comprises transmitting a page of content including the image encoded using said markup language back to the user.

Such an approach can be used to provide a service for end users to convert their images from a standard image format into a markup encoding. This then allows the end users to provide their images in a more protected format, for which copying is more difficult.

Another embodiment of the invention provides a computer program product comprising computer program instructions stored on a non-transitory computer-readable storage medium, wherein the computer program instructions, when loaded into and executed by a computer system, cause the computer system to perform a method of incorporating an image into a page of content for transmission over a telecommunications network from a server to a client for display by a browser running on the client. The method comprises: providing an image data file encoding said image in accordance with a standard image format; providing a page of content in a markup language, said page of content being intended for transmission over a telecommunications network from a server to a client for display by a browser running on the client, said page of content including a link or reference to the image data file for incorporating the image within the page of content; converting said image from said standard image format of the image data file into a format in which the image is encoded using said markup language; and incorporating the image encoded using said markup language into the page of content to replace said link or reference to the image data file prior to transmission of the page of content over a telecommunications network.

Another embodiment of the invention provides an apparatus for incorporating an image into a page of content for transmission over a telecommunications network from a server to a client for display by a browser running on the client. The apparatus includes memory and a processor for executing instructions from the memory. The apparatus is configured to: provide an image data file encoding said image in accordance with a standard image format; provide a page of content in a markup language, said page of content being intended for transmission over a telecommunications network from a server to a client for display by a browser running on the client, said page of content including a link or reference to the image data file for incorporating the image within the page of content; convert said image from said standard image format of the image data file into a format in which the image is encoded using said markup language; and incorporate the image encoded using said markup language into the page of content to replace said link or reference to the image data file prior to transmission of the page of content over a telecommunications network.

The computer program product and apparatus embodiments will generally benefit from the same particular features as described above with reference to the method embodiments.

The approach described herein may be implemented by a processor executing software, where the software is provided, for example, as part of a web server, an application program, a utility tool, an operating system, firmware, etc. The above approach may also be implemented in hardware. A software or computer program implementation may distributed on a storage medium such as a DVD, CD-ROM, etc, or stored as part of a system, e.g. within some device ROM.

BRIEF DESCRIPTION OF THE DRAWINGS

Various embodiments of the invention will now be described in detail by way of example only with reference to the following drawings.

DETAILED DESCRIPTION

Figure 1:
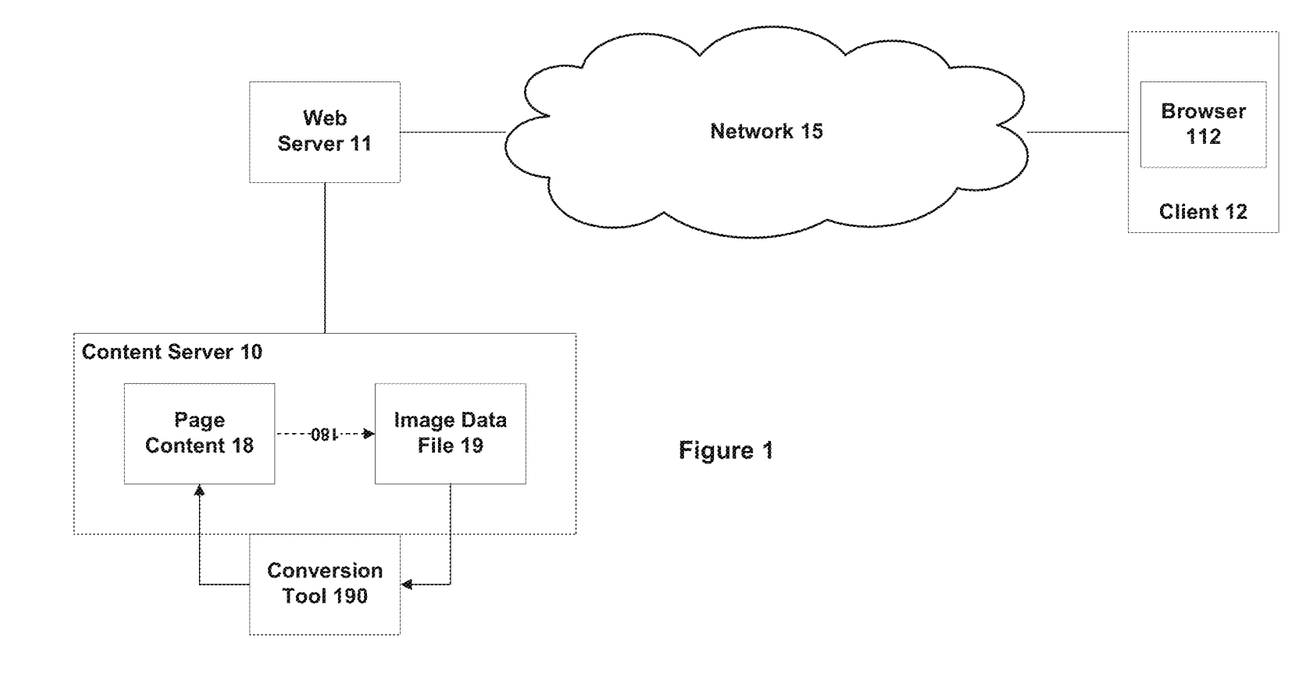
FIG. 1 is a schematic diagram of a distributed computer system in accordance with one embodiment of the invention.

FIG. 1 is a schematic diagram of a distributed computer system in accordance with one embodiment of the invention, in which page content 18 is to be sent from a content server 10 to a recipient system, namely client 12, via network 15. The client 12 may represent any suitable system, for example a desktop computer, a laptop, a tablet, a netbook, a portable (handheld) computer and/or communications device, a 3G mobile telephone (such as a smartphone), a television receiver with web support, etc. Accordingly, network 15 may represent the Internet, a company intranet, a telephone network, or any other suitable wired or wireless telecommunications network (or combination of such networks).

In some embodiments, the content server 10 may interact with a web server 11 or other form of front end device in order to send the page content 18 to recipient system 12 over network 15. In particular, the client system 12 may send a request for material to the web server 11 using browser 112 (e.g. Microsoft Internet Explorer, Firefox, Google Chrome, Apple Safari, etc) which is running on the client system 12. If the client is operating over the worldwide web, this request is generally sent using the hypertext transfer protocol (http) and specifies the uniform resource locator (URL) of the desired content.

The web server 11 responds to this request by retrieving the relevant content (as specified by the URL) from content server 10, and then returning this content 18 back to the browser 112 on the requesting client. The link between the content sender 10 and the web server 11 may be over a local area network (LAN), a broadband or cable link, an intranet, a wide area network such as the Internet, a telephone network, or any other suitable communications network. In other embodiments, the web server 11 (or other front end device) and the content server 10 may be combined into a single system, so that the page content 18 is locally available to the web server 11. Overall, the skilled person will be aware of a wide variety of possible architectures for the server side of the distributed computing system of FIG. 1.

The content server 10 therefore transmits content 18 to the client 12 over network 15 in response to a request from the client. The request may be received and/or the transmission may be sent directly or indirectly between the client 12 and the content server 10, for example, via web server 11 or some other front-end device (if present). The content may represent a web page which the client requests from the content server 10 via web server 11, or some other similar type of content, e.g. as provided over a 3G telephone network. The content server 10 may store the page content 18 in advance of receiving a request from the client 12, or may generate the page content in part or in full in response to receiving the request from the client. In addition, the content server 10 may retrieve some or all of the page content from one or more other systems, databases, etc (not shown in FIG. 1).

The page content 18 is transmitted using a markup representation, in which the content is encoded using (for example) hypertext markup language (html), as for the worldwide web, or perhaps wireless markup language (wml) as used in some mobile (wireless) networks. Such a markup language utilises only a limited set of standard characters. Formatting and structural information for the content is specified by including tags (markup), for example to denote paragraphs, italics, etc. These tags also use only the limited set of standard characters. Hence, such a markup representation allows the content to be specified or defined using just the limited set of standard characters, which greatly assists portability, i.e. allowing the content to be displayed or rendered on many different types of device.

The markup language supports the use of a tag to specify a link (reference) to other material that is to be incorporated into the page content. Note that this link, such as the img src tag described above, specifies material to be displayed (embedded) in the current page (in contrast to a hyperlink, which is a reference or link to material that can be accessed from the current page by the user at the client clicking or otherwise activating the hyperlink). Arrow 180 in FIG. 1 schematically represents such a link, by which page content 18 incorporates image data file 19. In general, this linked material is encoded in a format specific to the type of data file. For example, an image file might be encoded as a JPEG or GIF file, while an audio file might be encoded as an MP3 file or a WMA file. These file types are generally specific to a particular type of data (image, sound, etc) and are not defined in terms of a markup representation. In contrast, the markup language is not designed specifically for representing images, and can be considered instead as being primarily intended for general or text-based content (as in "hypertext markup language").

Any given page of content may reference multiple different data files of various types. Some or all of the referenced data files may be located on the same system as the page content (such as for image data file 19 in FIG. 1, which is on the same system, namely content server 10, as the page content 18). In other cases, page content 18 may reference data files on one or more other systems, stored in databases, etc.

Browser 112 on client 12 receives and renders (displays) the page content 18 received from content server 10. In particular, the browser parses the markup tags to allow the page content to be displayed in accordance with the specified format and structure. The browser is also responsible for identifying in the page content 18 any linked material, e.g. a reference to an image data file 19. The browser then retrieves and renders the linked material in combination with the page content (assuming that type of data is supported by the browser, either directly or through use of a plugin).

In this approach, an image data file 19 to be included with the page content 18 using link 180 is directly accessible (as the original data file) to client 12. The client can therefore save their own, local copy of the image data file, and make (and possibly distribute) further copies. This may be undesirable for the original provider of the image data 19. For example, the original provider might charge money for access or use of the image data 19 via access to a particular web-site, and this source of revenue may be bypassed or devalued if the image data becomes readily available from another source (whether legitimate or otherwise). Alternatively, the original provider might consider the image to be private, intended only for limited viewing within a controlled group of friends on a social network site.

Accordingly, the content server 10 is provided with a conversion tool 190. The conversion tool typically comprises code (software instructions) executed by a processor. The conversion tool 190 may run on the same machine as the content server 10 or may be located on a different system. For example, the conversion tool may be provided as a front end, back end, or plug-in to the web server 11 or to the content server 10 (or to a combination of both these systems). In some cases the conversion tool 190 may be implemented as a dynamic link library (DLL) on (or available to) the web server 11 and/or the content server 10. The conversion tool 190 may provide an application programming interface (API) to facilitate use with the web server 11 and/or the content server 10.

The conversion tool 190 analyzes the structure of the image data file 19, which may be in one of various possible image formats for use with page content 18, such as a bitmap, JPG/JPEG, GIF, PNG or equivalent. The conversion tool 19 outputs the image as html. Note that html was not designed to represent images itself (as the name "hypertext" implies), nor is it normally used for this purpose. The html representation of the image then allows the image to be directly incorporated into page content 18. In other words, the link 180 in page content 18 to the image data file 19 is replaced by an html coding of the actual image itself (rather than just a reference to the image).

Figure 2:
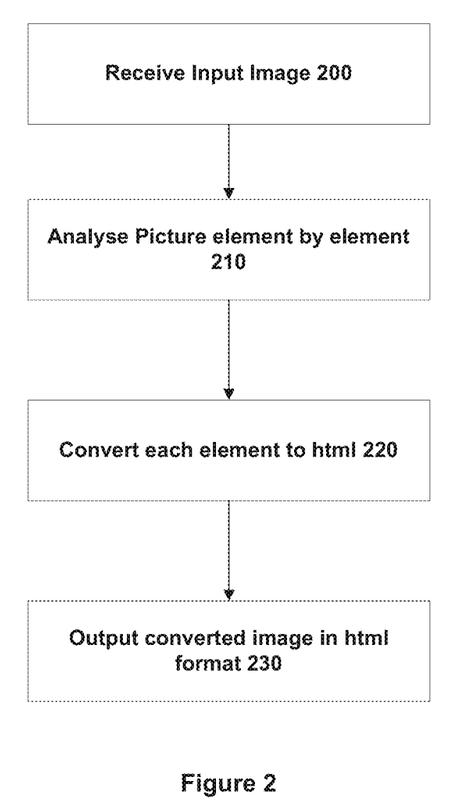
FIG. 2 is a flowchart illustrating the processing of an image conversion tool in accordance with one embodiment of the invention.

The operation of the conversion tool 19 in accordance with one embodiment of the invention is set out in FIG. 2. In general terms, the tool 19 receives an input picture 19, which is analyzed in terms of structure and colour. An html representation of the input image is then generated, using a mathematical algorithm that analyzes the picture bit by bit and represents the picture in terms of html. The output html image can then be transmitted for rendering by the client 12.

As shown in FIG. 2, at operation 200, the tool receives an input image in a typical image format, such as JPEG. At operation 210, the tool accesses and analyses the picture bit by bit, for example, pixel by pixel. At operation 220, the tool creates a dot in html using the <div> tag, the <span> tag, or any other tag that may represent a dot in html that corresponds to the relevant bit or portion of the input image. This dot represents (is equivalent to) the appearance of the corresponding portion of the input image. When all portions of the input image have been converted to html in this manner, at operation 230 the resulting image can be output in html format.

Figure 3:
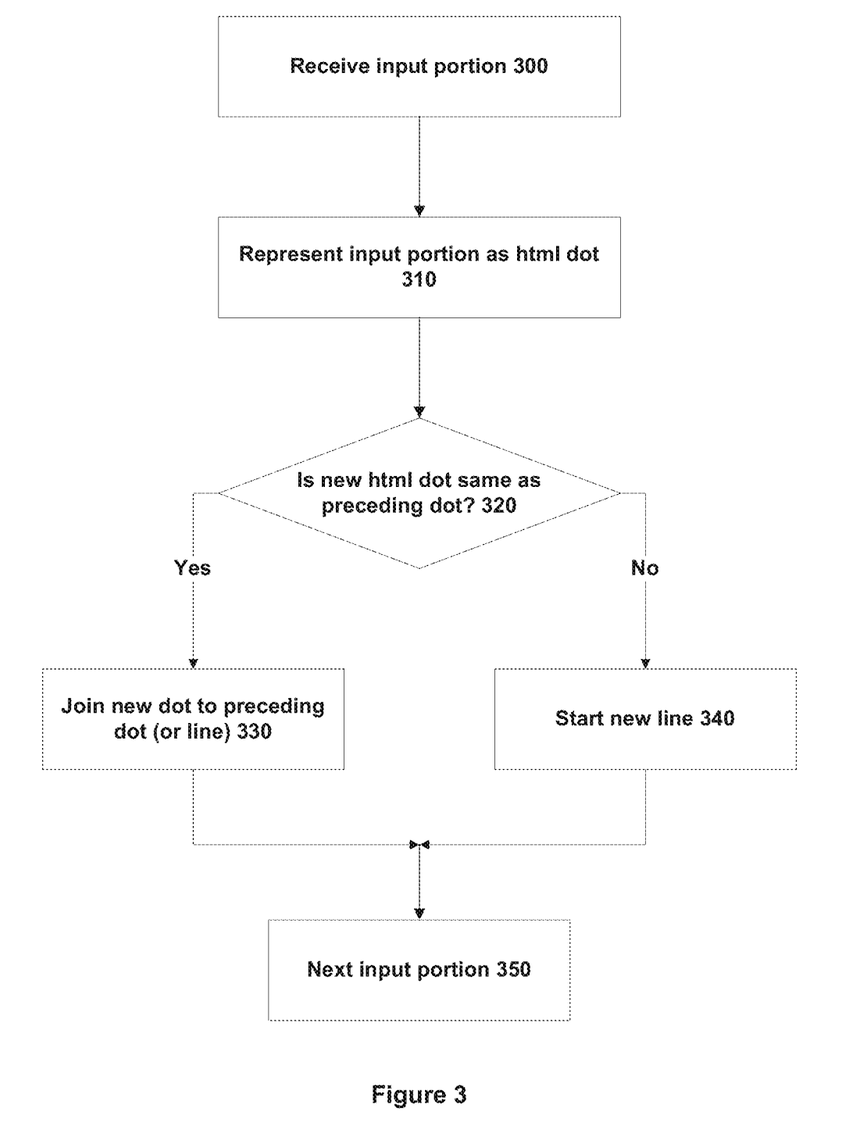
FIG. 3 is a flowchart illustrating the processing of FIG. 2 in more detail in accordance with one embodiment of the invention.

FIG. 3 illustrates this conversion procedure in more detail in accordance with one embodiment of the invention. At operation 300 an input portion of the image, e.g. a pixel, is received. At operation 310, this dot or portion of the input picture is represented by an equivalent dot in html by applying the correct colour code, using a HEX code or RGB representation. This conversion procedure may utilise web-safe colour codes (see http://en.wikipedia.org/wiki/Web-_colors). At operation 320, it is determined whether this new dot has the same colour as the preceding dot. If so, at operation 330, the new dot is joined together with the preceding dot into an html line. For example, if two adjacent dots have the same colour, they are transformed to an html line of length two dots. If the next html dot again is a dot represented in the same colour, the line length now becomes equivalent to 3 dots etc. On the other hand, if it is determined at operation 320 that the new dot does not have the same colour as the preceding dot, i.e. it represents a change of colour, at operation 340 the system finishes the current line, and creates a new line starting with the length of a single dot in the new colour. At operation 350, the system then proceeds to handle the next input portion, and processing returns to operation 300.

In accordance with the approach described above, the html graphics for the input image are formed line by line. As a result, the picture or image is painted using html, and hence a picture can be represented in page content 18 in html format, instead of the original picture format of image data file 19.

In some cases, the html representation of the image may be rather large (reflecting in part that html is not a specialised image format). The conversion tool can implement various strategies to reduce the image size, for example by lowering the resolution of the image. This lowering of the resolution can be performed as a preliminary operation on the original image (while still in a specialised image format), or as part of the conversion process itself, or on the html output image. One option is to replace a block of pixels in the original image with a single pixel representing the average of the block. Another option involves subsampling the pixels in the original image, for example taking only every other pixel, or every other line of pixels. A further possibility is to reduce the resolution of the image only in those portions of the image that contain relatively little detail—i.e. relatively little high frequency information.

In some cases, the conversion tool may introduce a watermark or other indication of origin into the image in markup form as part of the conversion process. This can lead to slight, subtle variations between the original image from image data file 19 and the resulting (converted) image, but such variations generally have little (or no) visibility to the human eye. In addition, it is very difficult (if not impossible) to remove the watermark from the image in markup form. The watermark can therefore act as a signature for the image in markup form, allowing the person who performed the conversion to demonstrate some ownership rights in the image (for example, in the event of a copyright dispute).

In one implementation, the conversion tool 190 for analyzing and generating an html picture (image) representation is integrated into the content server 10 or into the web server 11. Alternatively, the conversion tool might be provided as a standalone tool, or as an add-on or plug-in to content server 10 and/or web server 11. Note that the browser 112 on client 12 for receiving the page content 18 is not required to have any special software, since browser 112 is already able to handle the html coding of page content 18, and hence can also handle the html coding for the converted image. Accordingly, the page content including the converted image can be displayed (rendered) by any standard browser.

Figure 4:
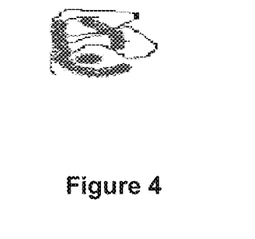
FIG. 4 is an example of an image for use in a page of content, wherein the image can be converted into a markup language encoding.

FIG. 4 is an image representing a logo. Table 1 lists the html that was produced by converting the image of FIG. 4 into html format using the approach described above. If read by a browser, the html of Table 1 would have the same appearance as the image of FIG. 4. Note that although the image of FIG. 4 is monochromatic (red), the approach described herein can also be employed with multi-coloured drawings and images.

TABLE 1

```
<style>
.1
{
border: none 0px black;
height:1px;
position:absolute;
border-top-style: solid;
border-top-width: 1px;
border-top-color:#FF0000;
float: left;
}
.2
{
border: none 0px black;
height:1px;
position:absolute;
border-top-style: solid;
border-top-width: 1px;
border-top-color:#000000;
float: left;
}
.3
{
border: none 0px black;
height:1px;
position:absolute;
border-top-style: solid;
border-top-width: 1px;
border-top-color:#00FF00;
float: left;
}
</style>
<div style="position:relative;">
<div style="top:1px;left:20px;width:9px" class="2"></div>
<div style="top:2px;left:19px;width:2px" class="2"></div>
<div style="top:2px;left:28px;width:17px" class="2"></div>
<div style="top:3px;left:18px;width:2px" class="2"></div>
<div style="top:3px;left:28px;width:2px" class="3"></div>
<div style="top:3px;left:31px;width:14px" class="3"></div>
<div style="top:3px;left:45px;width:5px" class="2"></div>
<div style="top:4px;left:17px;width:1px" class="2"></div>
<div style="top:4px;left:30px;width:2px" class="3"></div>
<div style="top:4px;left:50px;width:3px" class="2"></div>
<div style="top:5px;left:17px;width:1px" class="2"></div>
<div style="top:5px;left:53px;width:3px" class="2"></div>
<div style="top:6px;left:17px;width:1px" class="2"></div>
<div style="top:6px;left:55px;width:1px" class="2"></div>
<div style="top:7px;left:17px;width:1px" class="2"></div>
<div style="top:7px;left:55px;width:1px" class="2"></div>
<div style="top:8px;left:15px;width:2px" class="2"></div>
<div style="top:8px;left:26px;width:5px" class="2"></div>
<div style="top:8px;left:31px;width:1px" class="1"></div>
<div style="top:8px;left:32px;width:5px" class="2"></div>
<div style="top:8px;left:55px;width:1px" class="2"></div>
<div style="top:9px;left:14px;width:1px" class="2"></div>
<div style="top:9px;left:22px;width:4px" class="2"></div>
<div style="top:9px;left:29px;width:5px" class="1"></div>
<div style="top:9px;left:55px;width:1px" class="2"></div>
<div style="top:10px;left:14px;width:1px" class="2"></div>
<div style="top:10px;left:17px;width:1px" class="1"></div>
<div style="top:10px;left:21px;width:1px" class="2"></div>
<div style="top:10px;left:28px;width:7px" class="1"></div>
<div style="top:10px;left:54px;width:1px" class="2"></div>
<div style="top:11px;left:14px;width:1px" class="2"></div>
<div style="top:11px;left:16px;width:2px" class="1"></div>
<div style="top:11px;left:19px;width:1px" class="1"></div>
<div style="top:11px;left:21px;width:1px" class="2"></div>
<div style="top:11px;left:28px;width:7px" class="1"></div>
<div style="top:11px;left:53px;width:1px" class="2"></div>
<div style="top:12px;left:14px;width:5px" class="1"></div>
<div style="top:12px;left:20px;width:1px" class="1"></div>
<div style="top:12px;left:27px;width:10px" class="1"></div>
<div style="top:12px;left:52px;width:2px" class="2"></div>
<div style="top:13px;left:15px;width:2px" class="1"></div>
<div style="top:13px;left:18px;width:3px" class="1"></div>
<div style="top:13px;left:28px;width:5px" class="1"></div>
<div style="top:13px;left:34px;width:1px" class="1"></div>
<div style="top:13px;left:36px;width:3px" class="1"></div>
<div style="top:13px;left:50px;width:2px" class="2"></div>
<div style="top:14px;left:13px;width:9px" class="1"></div>
<div style="top:14px;left:29px;width:8px" class="1"></div>
<div style="top:14px;left:38px;width:3px" class="1"></div>
<div style="top:14px;left:49px;width:1px" class="2"></div>
<div style="top:15px;left:13px;width:8px" class="1"></div>
<div style="top:15px;left:29px;width:9px" class="1"></div>
<div style="top:15px;left:39px;width:3px" class="1"></div>
```

TABLE 1-continued

```
<div style="top:15px;left:48px;width:2px" class="2"></div>
<div style="top:16px;left:13px;width:3px" class="1"></div>
<div style="top:16px;left:17px;width:1px" class="1"></div>
<div style="top:16px;left:18px;width:1px" class="2"></div>
<div style="top:16px;left:19px;width:2px" class="1"></div>
<div style="top:16px;left:31px;width:5px" class="1"></div>
<div style="top:16px;left:37px;width:3px" class="1"></div>
<div style="top:16px;left:41px;width:2px" class="1"></div>
<div style="top:16px;left:47px;width:1px" class="2"></div>
<div style="top:16px;left:50px;width:3px" class="2"></div>
<div style="top:17px;left:14px;width:7px" class="1"></div>
<div style="top:17px;left:32px;width:5px" class="1"></div>
<div style="top:17px;left:38px;width:3px" class="1"></div>
<div style="top:17px;left:42px;width:3px" class="1"></div>
<div style="top:17px;left:45px;width:5px" class="2"></div>
<div style="top:17px;left:52px;width:1px" class="2"></div>
<div style="top:18px;left:14px;width:7px" class="1"></div>
<div style="top:18px;left:34px;width:1px" class="1"></div>
<div style="top:18px;left:36px;width:4px" class="1"></div>
<div style="top:18px;left:41px;width:3px" class="1"></div>
<div style="top:18px;left:44px;width:1px" class="2"></div>
<div style="top:18px;left:45px;width:1px" class="1"></div>
<div style="top:18px;left:46px;width:2px" class="2"></div>
<div style="top:18px;left:53px;width:1px" class="2"></div>
<div style="top:19px;left:13px;width:1px" class="1"></div>
<div style="top:19px;left:15px;width:5px" class="1"></div>
<div style="top:19px;left:35px;width:11px" class="1"></div>
<div style="top:19px;left:54px;width:1px" class="2"></div>
<div style="top:20px;left:13px;width:4px" class="1"></div>
<div style="top:20px;left:18px;width:2px" class="1"></div>
<div style="top:20px;left:36px;width:1px" class="1"></div>
<div style="top:20px;left:38px;width:8px" class="1"></div>
<div style="top:20px;left:48px;width:1px" class="1"></div>
<div style="top:20px;left:55px;width:1px" class="2"></div>
<div style="top:21px;left:12px;width:8px" class="1"></div>
<div style="top:21px;left:36px;width:6px" class="1"></div>
<div style="top:21px;left:43px;width:6px" class="1"></div>
<div style="top:21px;left:55px;width:1px" class="2"></div>
<div style="top:22px;left:14px;width:2px" class="1"></div>
<div style="top:22px;left:16px;width:1px" class="2"></div>
<div style="top:22px;left:18px;width:2px" class="1"></div>
<div style="top:22px;left:31px;width:7px" class="2"></div>
<div style="top:22px;left:38px;width:1px" class="1"></div>
<div style="top:22px;left:39px;width:1px" class="2"></div>
<div style="top:22px;left:40px;width:10px" class="1"></div>
<div style="top:22px;left:56px;width:1px" class="2"></div>
<div style="top:23px;left:13px;width:8px" class="1"></div>
<div style="top:23px;left:21px;width:1px" class="2"></div>
<div style="top:23px;left:28px;width:3px" class="1"></div>
<div style="top:23px;left:38px;width:3px" class="1"></div>
<div style="top:23px;left:40px;width:7px" class="1"></div>
<div style="top:23px;left:48px;width:1px" class="1"></div>
<div style="top:23px;left:57px;width:1px" class="2"></div>
<div style="top:24px;left:14px;width:7px" class="1"></div>
<div style="top:24px;left:22px;width:6px" class="2"></div>
<div style="top:24px;left:37px;width:1px" class="2"></div>
<div style="top:24px;left:42px;width:7px" class="1"></div>
<div style="top:24px;left:58px;width:1px" class="2"></div>
<div style="top:25px;left:14px;width:7px" class="1"></div>
<div style="top:25px;left:33px;width:4px" class="2"></div>
<div style="top:25px;left:42px;width:8px" class="1"></div>
<div style="top:25px;left:59px;width:1px" class="2"></div>
<div style="top:26px;left:14px;width:1px" class="1"></div>
<div style="top:26px;left:16px;width:3px" class="1"></div>
<div style="top:26px;left:20px;width:2px" class="1"></div>
<div style="top:26px;left:30px;width:3px" class="2"></div>
<div style="top:26px;left:42px;width:8px" class="1"></div>
<div style="top:26px;left:59px;width:1px" class="2"></div>
<div style="top:27px;left:14px;width:7px" class="1"></div>
<div style="top:27px;left:29px;width:1px" class="2"></div>
<div style="top:27px;left:44px;width:5px" class="1"></div>
<div style="top:27px;left:60px;width:1px" class="2"></div>
<div style="top:28px;left:14px;width:7px" class="1"></div>
<div style="top:28px;left:27px;width:2px" class="2"></div>
<div style="top:28px;left:43px;width:7px" class="1"></div>
<div style="top:28px;left:61px;width:1px" class="2"></div>
<div style="top:29px;left:14px;width:8px" class="1"></div>
<div style="top:29px;left:25px;width:2px" class="2"></div>
<div style="top:29px;left:43px;width:9px" class="1"></div>
<div style="top:29px;left:62px;width:1px" class="2"></div>
<div style="top:30px;left:14px;width:9px" class="1"></div>
<div style="top:30px;left:23px;width:2px" class="2"></div>
<div style="top:30px;left:44px;width:6px" class="1"></div>
<div style="top:30px;left:62px;width:2px" class="2"></div>
<div style="top:31px;left:14px;width:2px" class="1"></div>
<div style="top:31px;left:17px;width:3px" class="1"></div>
<div style="top:31px;left:21px;width:1px" class="1"></div>
<div style="top:31px;left:22px;width:2px" class="2"></div>
<div style="top:31px;left:43px;width:8px" class="1"></div>
<div style="top:31px;left:62px;width:2px" class="2"></div>
<div style="top:32px;left:15px;width:3px" class="1"></div>
<div style="top:32px;left:19px;width:3px" class="1"></div>
<div style="top:32px;left:43px;width:5px" class="1"></div>
<div style="top:32px;left:49px;width:1px" class="1"></div>
<div style="top:32px;left:63px;width:2px" class="2"></div>
<div style="top:33px;left:14px;width:1px" class="1"></div>
<div style="top:33px;left:16px;width:5px" class="1"></div>
<div style="top:33px;left:30px;width:10px" class="2"></div>
<div style="top:33px;left:43px;width:7px" class="1"></div>
<div style="top:33px;left:64px;width:1px" class="2"></div>
<div style="top:34px;left:15px;width:5px" class="1"></div>
<div style="top:34px;left:21px;width:5px" class="1"></div>
<div style="top:34px;left:29px;width:1px" class="2"></div>
<div style="top:34px;left:39px;width:3px" class="2"></div>
<div style="top:34px;left:43px;width:7px" class="1"></div>
<div style="top:34px;left:64px;width:1px" class="2"></div>
<div style="top:35px;left:14px;width:8px" class="1"></div>
<div style="top:35px;left:28px;width:2px" class="2"></div>
<div style="top:35px;left:41px;width:1px" class="1"></div>
<div style="top:35px;left:43px;width:7px" class="1"></div>
<div style="top:35px;left:64px;width:1px" class="2"></div>
<div style="top:36px;left:16px;width:1px" class="1"></div>
<div style="top:36px;left:17px;width:1px" class="2"></div>
<div style="top:36px;left:18px;width:3px" class="1"></div>
<div style="top:36px;left:22px;width:1px" class="1"></div>
<div style="top:36px;left:27px;width:1px" class="2"></div>
<div style="top:36px;left:42px;width:2px" class="2"></div>
<div style="top:36px;left:44px;width:1px" class="1"></div>
<div style="top:36px;left:46px;width:3px" class="1"></div>
<div style="top:36px;left:64px;width:1px" class="2"></div>
<div style="top:37px;left:15px;width:7px" class="1"></div>
<div style="top:37px;left:27px;width:2px" class="2"></div>
<div style="top:37px;left:44px;width:1px" class="1"></div>
<div style="top:37px;left:46px;width:1px" class="1"></div>
<div style="top:37px;left:63px;width:1px" class="2"></div>
<div style="top:38px;left:14px;width:1px" class="1"></div>
<div style="top:38px;left:17px;width:3px" class="1"></div>
<div style="top:38px;left:21px;width:3px" class="1"></div>
<div style="top:38px;left:25px;width:3px" class="2"></div>
<div style="top:38px;left:44px;width:2px" class="2"></div>
<div style="top:38px;left:63px;width:1px" class="2"></div>
<div style="top:39px;left:14px;width:1px" class="2"></div>
<div style="top:39px;left:15px;width:2px" class="1"></div>
<div style="top:39px;left:18px;width:5px" class="1"></div>
<div style="top:39px;left:24px;width:2px" class="2"></div>
<div style="top:39px;left:45px;width:1px" class="2"></div>
<div style="top:39px;left:62px;width:2px" class="2"></div>
<div style="top:40px;left:13px;width:1px" class="1"></div>
<div style="top:40px;left:15px;width:1px" class="1"></div>
<div style="top:40px;left:17px;width:4px" class="1"></div>
<div style="top:40px;left:21px;width:1px" class="2"></div>
<div style="top:40px;left:22px;width:2px" class="1"></div>
<div style="top:40px;left:46px;width:1px" class="2"></div>
<div style="top:40px;left:61px;width:2px" class="2"></div>
<div style="top:41px;left:13px;width:1px" class="2"></div>
<div style="top:41px;left:15px;width:1px" class="1"></div>
<div style="top:41px;left:17px;width:6px" class="1"></div>
<div style="top:41px;left:28px;width:1px" class="1"></div>
<div style="top:41px;left:30px;width:1px" class="1"></div>
<div style="top:41px;left:32px;width:3px" class="1"></div>
<div style="top:41px;left:47px;width:3px" class="2"></div>
<div style="top:41px;left:61px;width:1px" class="2"></div>
<div style="top:42px;left:13px;width:1px" class="2"></div>
<div style="top:42px;left:14px;width:1px" class="1"></div>
<div style="top:42px;left:16px;width:2px" class="1"></div>
<div style="top:42px;left:26px;width:1px" class="1"></div>
<div style="top:42px;left:28px;width:9px" class="1"></div>
<div style="top:42px;left:38px;width:1px" class="1"></div>
<div style="top:42px;left:49px;width:1px" class="2"></div>
<div style="top:42px;left:60px;width:2px" class="2"></div>
```

TABLE 1-continued

```
<div style="top:43px;left:13px;width:1px" class="2"></div>
<div style="top:43px;left:15px;width:7px" class="1"></div>
<div style="top:43px;left:25px;width:13px" class="1"></div>
<div style="top:43px;left:39px;width:1px" class="1"></div>
<div style="top:43px;left:49px;width:1px" class="2"></div>
<div style="top:43px;left:55px;width:5px" class="2"></div>
<div style="top:44px;left:13px;width:1px" class="2"></div>
<div style="top:44px;left:14px;width:2px" class="1"></div>
<div style="top:44px;left:17px;width:5px" class="1"></div>
<div style="top:44px;left:26px;width:12px" class="1"></div>
<div style="top:44px;left:50px;width:6px" class="2"></div>
<div style="top:45px;left:13px;width:1px" class="2"></div>
<div style="top:45px;left:14px;width:9px" class="1"></div>
<div style="top:45px;left:25px;width:14px" class="1"></div>
<div style="top:46px;left:13px;width:1px" class="2"></div>
<div style="top:46px;left:14px;width:5px" class="1"></div>
<div style="top:46px;left:20px;width:2px" class="1"></div>
<div style="top:46px;left:23px;width:1px" class="1"></div>
<div style="top:46px;left:26px;width:12px" class="1"></div>
<div style="top:47px;left:12px;width:1px" class="2"></div>
<div style="top:47px;left:15px;width:8px" class="1"></div>
<div style="top:47px;left:25px;width:13px" class="1"></div>
<div style="top:48px;left:12px;width:1px" class="2"></div>
<div style="top:48px;left:15px;width:1px" class="1"></div>
<div style="top:48px;left:17px;width:7px" class="1"></div>
<div style="top:48px;left:26px;width:10px" class="1"></div>
<div style="top:49px;left:12px;width:1px" class="2"></div>
<div style="top:49px;left:17px;width:1px" class="1"></div>
<div style="top:49px;left:19px;width:7px" class="1"></div>
<div style="top:49px;left:28px;width:1px" class="1"></div>
<div style="top:49px;left:30px;width:1px" class="1"></div>
<div style="top:49px;left:32px;width:3px" class="1"></div>
<div style="top:49px;left:36px;width:1px" class="1"></div>
<div style="top:49px;left:49px;width:1px" class="1"></div>
<div style="top:50px;left:12px;width:1px" class="2"></div>
<div style="top:50px;left:17px;width:8px" class="1"></div>
<div style="top:50px;left:47px;width:5px" class="1"></div>
<div style="top:51px;left:12px;width:1px" class="2"></div>
<div style="top:51px;left:19px;width:5px" class="1"></div>
<div style="top:51px;left:25px;width:4px" class="1"></div>
<div style="top:51px;left:45px;width:8px" class="1"></div>
<div style="top:52px;left:12px;width:1px" class="2"></div>
<div style="top:52px;left:18px;width:5px" class="1"></div>
<div style="top:52px;left:24px;width:4px" class="1"></div>
<div style="top:52px;left:43px;width:10px" class="1"></div>
<div style="top:53px;left:12px;width:2px" class="2"></div>
<div style="top:53px;left:18px;width:15px" class="1"></div>
<div style="top:53px;left:39px;width:15px" class="1"></div>
<div style="top:54px;left:13px;width:1px" class="2"></div>
<div style="top:54px;left:21px;width:5px" class="1"></div>
<div style="top:54px;left:27px;width:8px" class="1"></div>
<div style="top:54px;left:37px;width:1px" class="1"></div>
<div style="top:54px;left:39px;width:3px" class="1"></div>
<div style="top:54px;left:43px;width:10px" class="1"></div>
<div style="top:55px;left:13px;width:1px" class="2"></div>
<div style="top:55px;left:19px;width:1px" class="1"></div>
<div style="top:55px;left:22px;width:9px" class="1"></div>
<div style="top:55px;left:32px;width:1px" class="1"></div>
<div style="top:55px;left:34px;width:6px" class="1"></div>
<div style="top:55px;left:41px;width:11px" class="1"></div>
<div style="top:56px;left:13px;width:2px" class="2"></div>
<div style="top:56px;left:26px;width:3px" class="1"></div>
<div style="top:56px;left:30px;width:5px" class="1"></div>
<div style="top:56px;left:36px;width:3px" class="1"></div>
<div style="top:56px;left:40px;width:12px" class="1"></div>
<div style="top:57px;left:14px;width:1px" class="2"></div>
<div style="top:57px;left:23px;width:1px" class="1"></div>
<div style="top:57px;left:25px;width:1px" class="1"></div>
<div style="top:57px;left:27px;width:9px" class="1"></div>
<div style="top:57px;left:37px;width:13px" class="1"></div>
<div style="top:58px;left:14px;width:2px" class="2"></div>
<div style="top:58px;left:25px;width:19px" class="1"></div>
<div style="top:58px;left:45px;width:3px" class="1"></div>
<div style="top:59px;left:29px;width:16px" class="1"></div>
<div style="top:60px;left:28px;width:1px" class="2"></div>
<div style="top:60px;left:31px;width:9px" class="1"></div>
<div style="top:60px;left:41px;width:1px" class="1"></div>
<div style="top:60px;left:44px;width:1px" class="1"></div>
<div style="top:61px;left:31px;width:2px" class="1"></div>
<div style="top:61px;left:36px;width:1px" class="1"></div>
<div style="top:61px;left:39px;width:1px" class="1"></div>
<div style="top:61px;left:41px;width:1px" class="1"></div>
</div>
```

The timing of the conversion processing shown in FIG. 3 may vary from one embodiment to another embodiment. In some implementations, the image data may be stored as image data file 19, and the conversion tool 190 performs the conversion "on-the-fly" (dynamically) each time the content server 10 receives a request from a client for a content 18 that includes a reference (link) to image data. In some cases, this may involve the content server parsing the page content 18 to locate any links 180 to image data files that are to be incorporated into the page content. Any image data files identified in this manner are then converted using conversion tool 190 and incorporated directly into page content 18. The content server can then return the page content 18 (including the image(s) converted into a markup representation) to the client. Such an approach is especially suitable for situations in which the image data file 19 is itself only generated at the time of the client request, for example, if the image is generated as a real-time snapshot of a live video feed.

Performing the image conversion "on-the-fly" as above, helps to minimise storage requirements, since the image data files 19 are stored only in the native image formats, such as JPEG, which are generally designed to provide good data compression (in part because they can take advantage of image-specific compression techniques). However, such an approach may cause a delay in responding to the client, as the content server needs to identify any images to be converted, and then perform the relevant conversions, prior to responding to the client. In addition, a given image may be converted multiple times if the same page content is repeatedly requested.

In some cases, the content server 10 may maintain a table or some other record that identifies which image data files are to be embedded in any given page content. One option is to populate the table whenever content is parsed to determine embedded images. The next time this page content is requested, the content server is now able to identify quickly from the table those image data files that are to be converted for a given content page, without having to parse (again) the content itself to locate such image data files. This technique helps to reduce the time for the content server to produce the final page content (including the image(s) converted into a markup representation), although it is more difficult to implement if the page content 18 is generated dynamically (in whole or in part) in response to the browsing request from client 12.

A further option is that each time an image is converted into a markup representation, the content server stores the resulting converted image in the markup representation. In this manner, the next time that page content is requested that is determined to include the relevant image, the already converted form of the image can be retrieved and rapidly incorporated into a page content 18 in response to a request for that content. Note that if storage is limited, some form of caching scheme can be used to delete markup representations of images that are rarely used. In addition, the content server may be pre-populated (in effect) with converted images by initially generating a markup representation of an image (in advance of receiving any client requests for such an image).

A further option is that the (pre)-converted images are stored in the content pages themselves (rather than separately as converted images). This option is primarily useful for pages that are created independently of any client request (rather than being dynamically generated for each request). With this approach, the page is therefore ready for immediate return to the client upon request (without having to locate and incorporate any converted images). However, this approach requires additional storage if a given (converted) image is used in multiple pages, since the converted image itself in markup representation is now stored in each page, rather than just a link to the converted image to be embedded. This approach is especially attractive for pages that are frequently requested by clients (since the repeated savings in processing time are more likely to compensate for the additional storage required).

As mentioned above, the conversion tool 190 may be implemented as an add-on to web server 11. On possibility is that the conversion tool 190 sits, in effect, on the network side of web server 11, converting images into mark-up form as they are sent out from web server 11 to clients over the network 15. In this configuration, the presence of conversion tool 190 may be transparent to web server 11. Note that the conversion tool may only convert selected images to mark-up form, based for example on factors such as the requested image (or URL), the network address of the requesting client, and/or any other information about the client, such as may be provided for example by a cookie. One possibility is that the conversion tool does not convert images into markup form that are being sent to subscribers to web-site 11, but does convert images into markup form that are being sent to casual visitors to web-site 11 (the former may be differentiated from the latter by known mechanisms, such as accessed URL, cookies, etc).

Such an approach might be used for an image supply service, where subscribers have to pay for full access to the original images (not in markup form). This approach might also be used where web-site 11 provides some social network functionality, such as Facebook or Flickr, etc. In this case, if a person posts certain images to their social network site, the system may provide the original images to other users who have a particular relationship to the person—e.g. they are designated as friends of the person within the social network. However, if the person is prepared for other users (not friends) to access the images, the system might allow the person to specify that the images are only available in markup form to these other users (so that they cannot be readily copied or further distributed). In other cases, a person might prefer that the images are distributed in markup form to all other users (whether friends or not).

Using a markup language to serve an image to a client as described herein therefore has various benefits. By avoiding the use of an img src tag or similar, there is no easy way for the browser (or any other system) to determine automatically that the page does, in fact, include an image. Consequently, if a user right-clicks over the image, the browser will not present the user with any options to copy or save the image (but rather just the standard right-click menu for the page content as a whole). This then provides a form of copy-protection to help maintain the privacy or intellectual property rights in the image.

Similarly, there are some parties who use robots or other systems to crawl the web to extract automatically large numbers of images from web pages. Such parties may then use the extracted images for various purposes, such as re-selling or distributing the image (even if not authorised to do so), or simulating another web-site (phishing), such as the web-site of a bank, to persuade unwary consumers to enter their security information, or a (fake) ticket sales site. The procedure described herein helps to protect web-site images from such image re-use, since the web crawlers are generally unable to copy (or even identify) the images that are incorporated into page content using a markup representation.

Another potential application of the approach described herein is for image search sites, such as Google images, which may return a large number of small (thumbnail) images in response to a user-entered search term. A user is then able to select one or more of the small images for their particular needs, and then obtain the corresponding image in full size (if so desired). In some cases, there may be a charge associated with use of the full image, especially for more specialised image search services, for example in relation to news images. The approach described herein allows an image supplier to provide a set of images in mark-up form for download to a potential client for review. The rights of the image supplier are protected, since the client is unable to re-use the images directly (because of their mark-up form); nevertheless, the client is able to preview the images, and to select one or more images for further use if so desired. (Such a selection might be subject to a payment, whereupon the user is then provided with the image in the original form, e.g. as a JPEG file, rather than in markup form, as originally provided for the preview screen).

A further possibility is that a web-site offers a conversion service, whereby users can upload images in the native image format, and receive the images back encoded in a markup language. This service might be provided for a charge, or may be funded by other mechanisms, for example, advertising.

The approach described herein also makes it more difficult to perform image filtering on the material received by a client system. Such image filtering is utilised by certain regimes, for example, as a form of censorship to present the distribution of politically sensitive images. However, it is very difficult for such filters to recognise (and remove) images when they are encoded in markup form.

A further possible application of the approach described herein is with reference to cloud-based office systems, such as Microsoft Office 365. These systems provide various functionality for a user including email. In one implementation, a user (who may represent a person or a corporation) uploads an image for the cloud-based server—such as a picture of the user or a logo for the corporation. The cloud-based system then converts this image into html and stores the image for inclusion in emails sent from the cloud-based system, for example, as a form of email signature. This approach can also be applied to automatically generated emails from web-sites, for example, that provide confirmation of transactions (such as on-line purchases, etc). Note that the same (html converted image may be systematically added to all emails for a given client (organisation) of the cloud-based account, even though this might span a potentially large number of individual email accounts for different users associated with that client.

In some cases, the cloud-based system may determine the format in which to send the image based on knowledge of the destination email address. For example, if the email is to be received by another email system that is cloud or web-based, and accessed via a browser, then the email might incorporate the image in its native format (say JPEG), while if the destination address is not cloud or web-based (or perhaps in cases of doubt), then the image might be sent in html format in order to ensure that the email signature is properly displayed (rather than being presented only as a link or indicated as being unavailable). In this way the presentation of the image can be adapted according to the expected reception.

A similar decision can also be made by an email server that holds incoming emails for a user. For example, if the server knows that the email account is being accessed using one mechanism that will generally display the image in native format, then it may decide not to convert the image (or not to use an already converted image if available). Alternatively, if the server knows that the email account is being accessed by a device that is more cautious about displaying images in emails, e.g. a Blackberry, then the same email might be provided with the image encoded using html format. Accordingly, the version of the image provided by an email server (whether for sending to a destination or downloading to the recipient) may vary according to any known information about the recipient.

Although various embodiments of the invention have been described above, the skilled person will be aware of further potential modifications and variations depending upon the particular context. For example, the skilled person will be aware of a range of possible timings and implementations for the image conversion described herein, and will adapt the implementation to the particular circumstances of that implementation. Accordingly, the present invention is defined by the scope of the attached claims and their equivalents.

What is claimed is:

1. A computer-implemented method of incorporating an image into a page of content for transmission over a telecommunications network from a server to a client for display by a browser running on the client, the method comprising:
   providing an image data file encoding said image in accordance with a standard image format;
   providing a page of content in a markup language, said page of content being intended for transmission over a telecommunications network from a server to a client for display by a browser running on the client, said page of content including a link or reference to the image data file for incorporating the image within the page of content;
   converting said image from said standard image format of the image data file into a format in which the image is encoded using said markup language; and
   incorporating the image encoded using said markup language into the page of content to replace said link or reference to the image data file prior to transmission of the page of content over a telecommunications network;
   wherein the converted image is built up on a line-by-line basis;
   wherein each line of the converted image comprises one or more HyperText Markup Language (HTML) image units, each HTML image unit being located in just a single line of the converted image and formed from a row of one or more consecutive pixels of the image which have the same color,
   wherein a first line of the converted image has a first arbitrary length and a second line of the converted image has a second arbitrary length, wherein both the first and second arbitrary lengths are independent of the lengths of other lines in the converted image.

2. The method of claim 1, wherein the image encoded using said markup language is incorporated into the page of content in response to parsing said reference or link with the page of content.

3. The method of claim 1, wherein the conversion of the image from said standard image format into the markup language is performed in response to receiving a request from the client for the page of content.

4. The method of claim 1, further comprising storing the converted image encoded using said markup language for use in responding to future requests for the page of content.

5. The method of claim 4, wherein the converted image is stored separately from the page of content for future incorporation into said page of content.

6. The method of claim 1, further comprising transmitting the page of content incorporating the image encoded using said markup language from a server to a receiving client.

7. The method of claim 6, wherein a browser on the receiving client renders the page of content so as to display the image within said page by directly using the image encoded by said markup language and without having to retrieve any image source file.

8. The method of claim 1, further comprising reducing the volume of the image encoded using said markup language.

9. The method of claim 8, wherein reducing the volume includes lowering the resolution of the image.

10. The method of claim 9, wherein lowering the resolution of the image is performed prior to converting the image.

11. The method of claim 9, wherein lowering the resolution of the image is performed as part of converting the image.

12. The method of claim 8, wherein lowering the resolution of the image comprises subsampling or averaging the image.

13. The method of claim 1, wherein converting the image includes adding a watermark to the image in markup form.

14. The method of claim 1, wherein said markup language comprises hypertext markup language (html).

* * * * *